March 24, 1953     J. W. PATTON ET AL     2,632,183
BERTH MOUNTING STRUCTURE
Filed Feb. 4, 1948     6 Sheets-Sheet 3
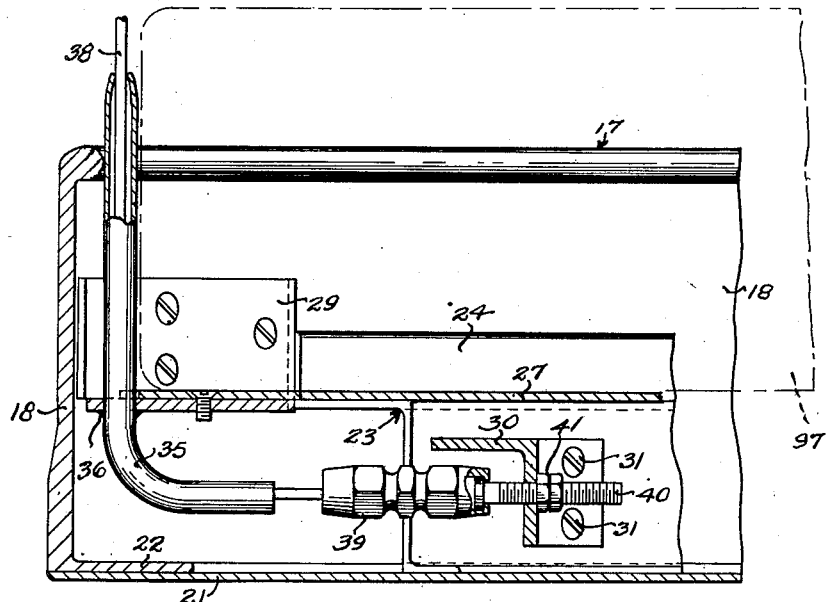
FIG_4_
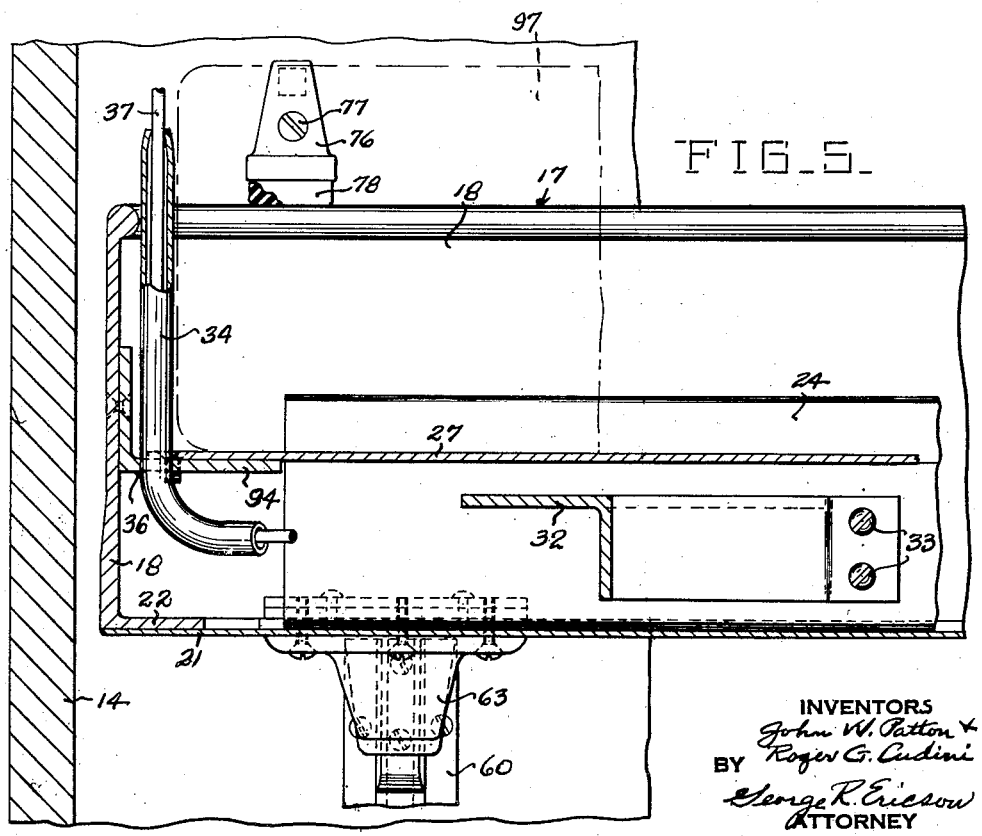
FIG_5_
INVENTORS
John W. Patton &
Roger G. Cudini
BY
George R. Ericson
ATTORNEY March 24, 1953  J. W. PATTON ET AL  2,632,183
BERTH MOUNTING STRUCTURE
Filed Feb. 4, 1948  6 Sheets-Sheet 4
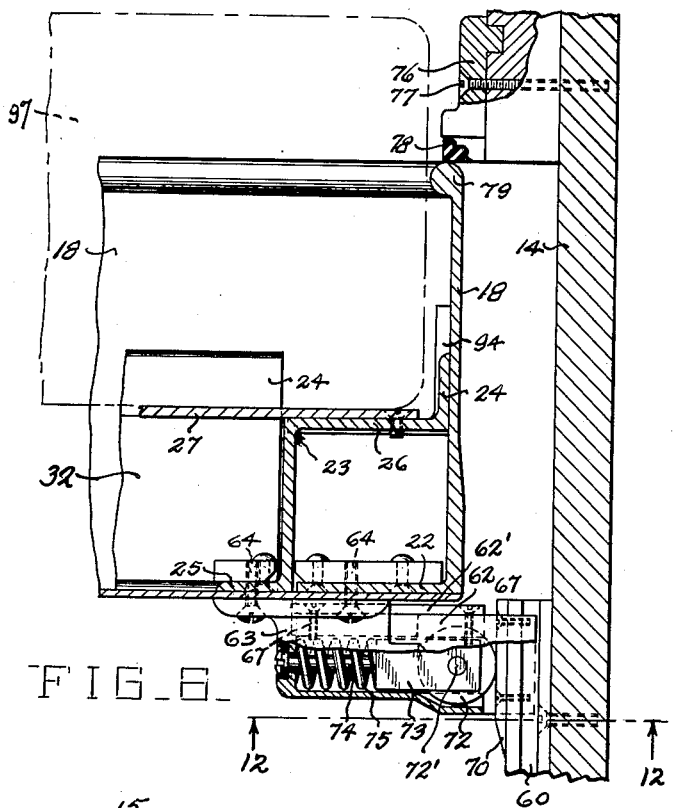
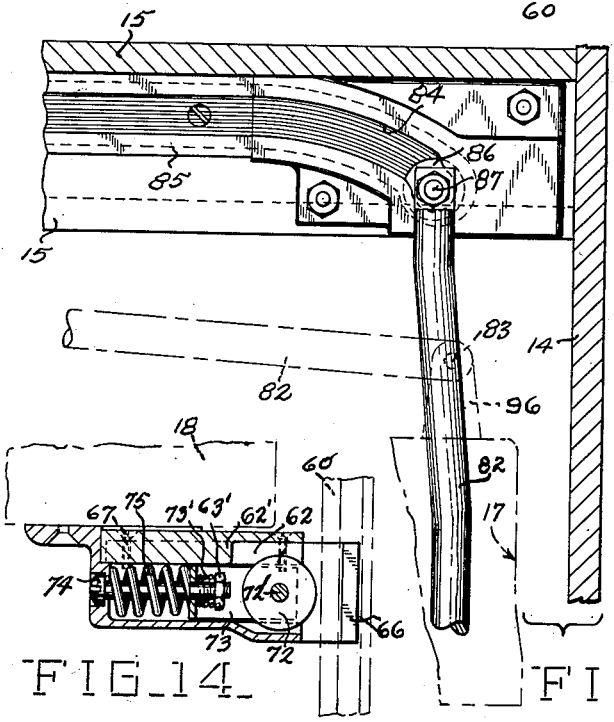
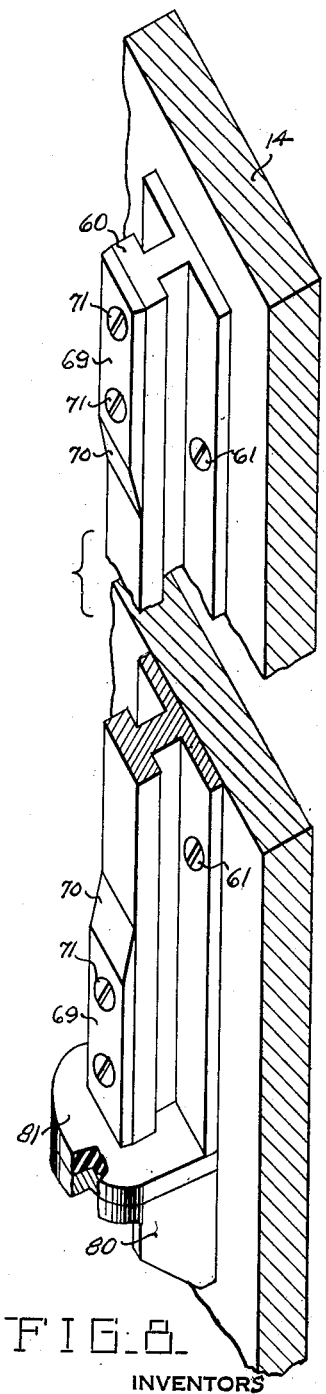
INVENTORS
John W. Patton &
BY Roger G. Cudini
George R. Ericson
ATTORNEY March 24, 1953  J. W. PATTON ET AL  2,632,183
BERTH MOUNTING STRUCTURE
Filed Feb. 4, 1948  6 Sheets-Sheet 5

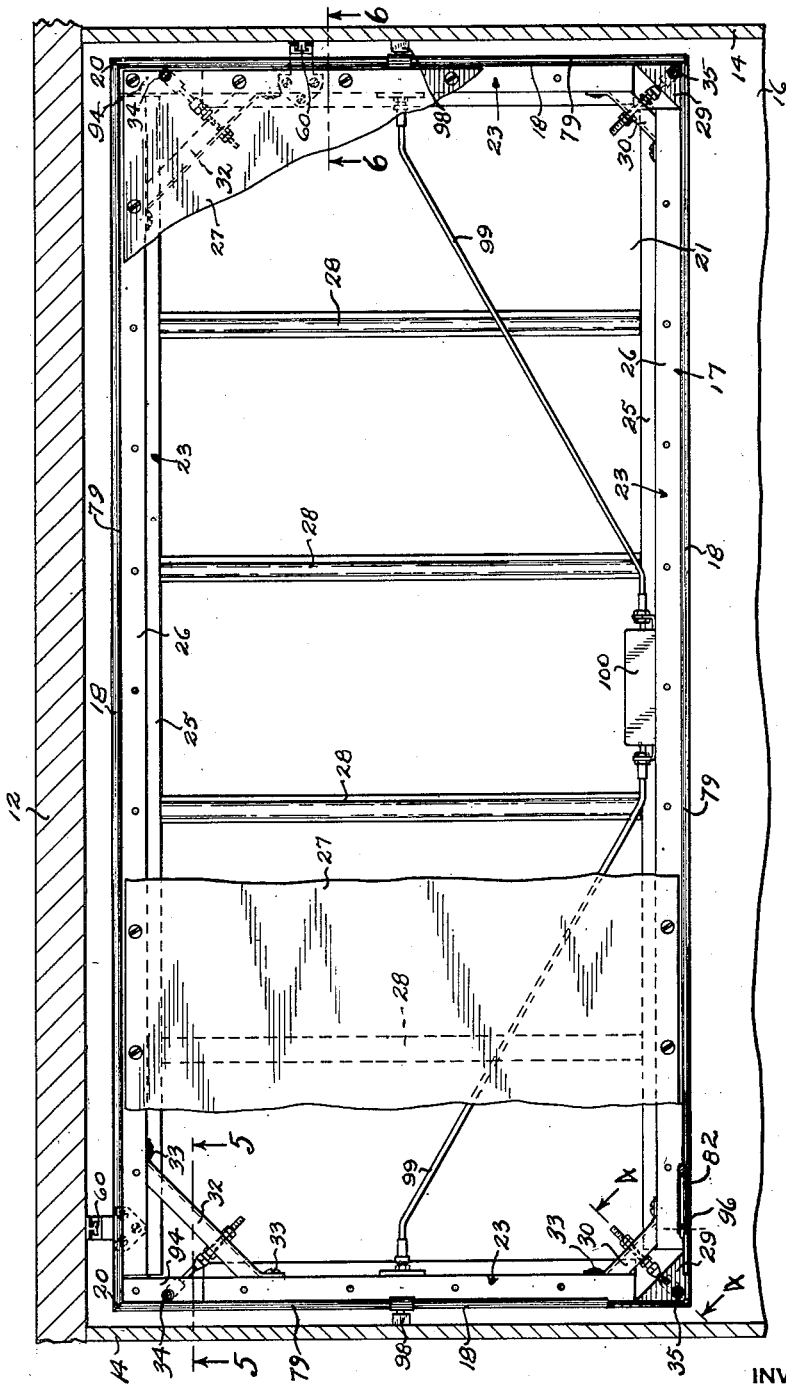

INVENTORS
John W. Patton &
BY Roger G. Cudini
George R. Erieson
ATTORNEY

March 24, 1953  J. W. PATTON ET AL  2,632,183
BERTH MOUNTING STRUCTURE
Filed Feb. 4, 1948  6 Sheets-Sheet 6
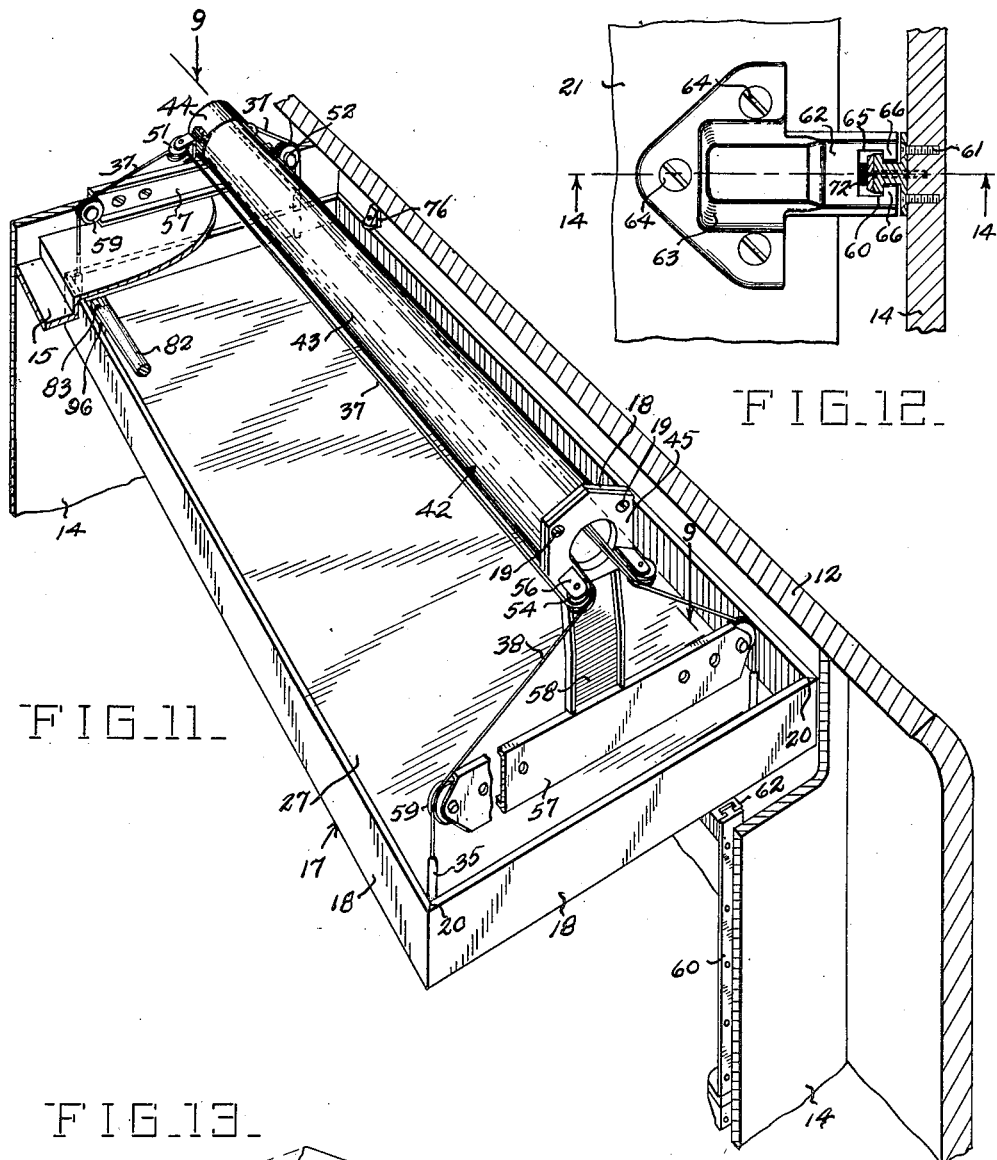
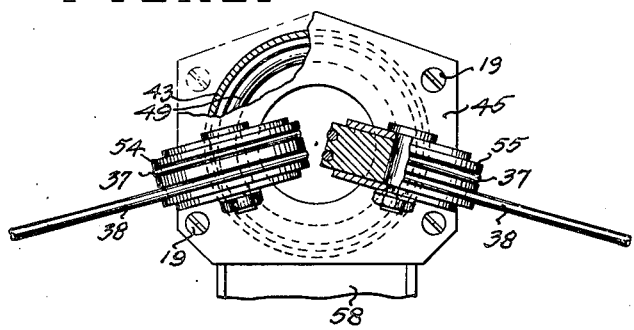
INVENTORS
John W. Patton &
BY Roger G. Cudini
George R. Ericson
ATTORNEY Patented Mar. 24, 1953

2,632,183

UNITED STATES PATENT OFFICE 2,632,183

BERTH MOUNTING STRUCTURE

John W. Patton, Philadelphia, Pa., and Roger G. Cudini, Birmingham, Mich.; said Patton assignor to American Car and Foundry Company, New York, N. Y., a corporation of New Jersey, and said Cudini assignor to Moynahan Bronze Company, Detroit, Mich., a corporation of Michigan Application February 4, 1948, Serial No. 6,258

9 Claims. (Cl. 5—10)

This invention relates to berths and more particularly to vertically movable berths.

Berths used in railway cars are usually pivotally mounted to swing between stored and prone positions but under some conditions it is desirable to mount the upper berth for vertical movement between stored and prone positions. For example, in some bedrooms it is desirable to swing a pivoted lower berth endwise into stored position which restricts the wall space immediately thereabove to such an extent that there is insufficient space to accommodate a pivoted upper berth. While vertically adjustable berths that can be stored adjacent a room ceiling have heretofore been used, they have been too heavy for practical use and their mounting and suspension mechanism have been such as to make them hard to manipulate.

It is an object of this invention to provide a vertically adjustable berth that can be shifted with minimum physical effort.

Another object of the invention is to provide supporting means for a vertically movable berth that will counterbalance the weight of the berth.

Another object of the invention is to provide guide means for a vertically movable sheet metal berth pan that will prevent berth pan distortion and undue frictional resistance to vertical movement.

A further object of the invention is to provide means for limiting the upper and lower positions of a vertically movable berth so that the final movement of the berth adjacent stored and prone positions will be cushioned.

These and other objects of the invention will be apparent to those skilled in the art from a study of the following description and accompanying drawings, in which:

Figure 3 is a horizontal sectional view in the bedroom taken on line 3—3 of Figure 10 showing the upper berth pan in plan.

Figure 4 is a sectional view taken on line 4—4 of Figure 3 showing one corner of the berth pan.

Figure 5 is a sectional view taken on line 5—5 of Figure 3 showing a fragment of the berth pan.

Figure 6 is a sectional view of the berth pan taken on line 6—6 of Figure 3.

Figure 7 is a front view of the berth pan supporting rod and its mounting in the car.

Figure 8 is a perspective view of one of the guide tracks for the berth pan.

Figure 11 is a perspective view in the bedroom with the ceiling broken away showing the berth pan and its suspension mechanism.

Figure 12 is a sectional fragmentary view of a shoe and its track taken on line 12—12 of Figure 6.

Figure 13 is a sectional view of the pan suspension mechanism taken on line 13—13 of Figure 9.

Figure 14 is a sectional view of a guide means taken on line 14—14 of Figure 12.

Figure 1:
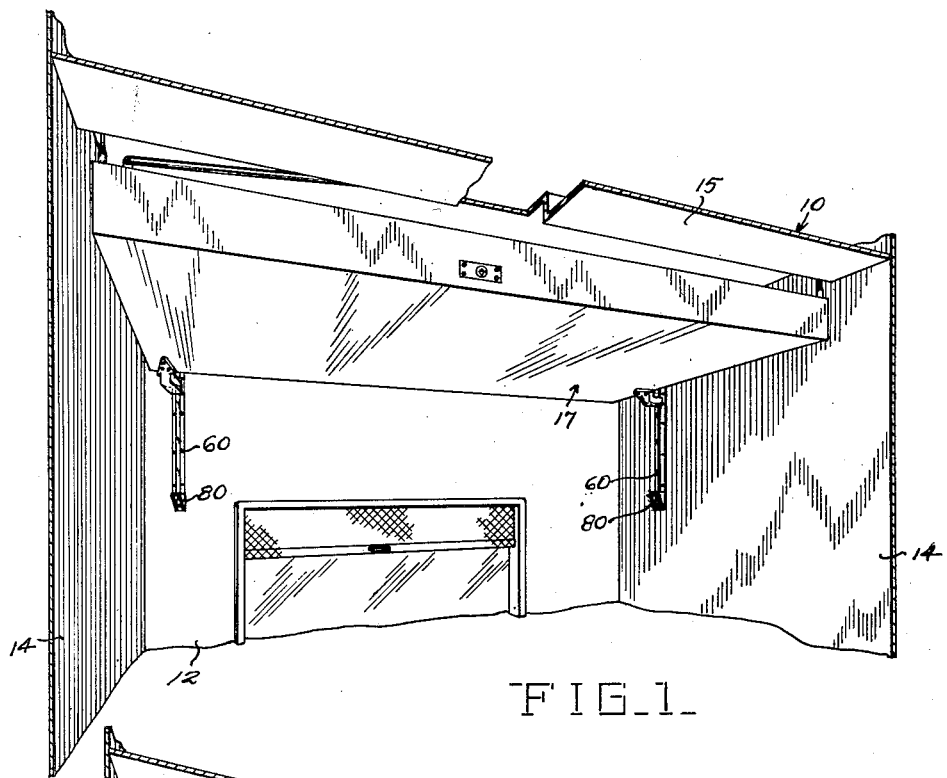
Figure 1 is a vertical sectional view of the upper portion of a rail car bedroom showing the upper berth in stored position.
Figure 2:
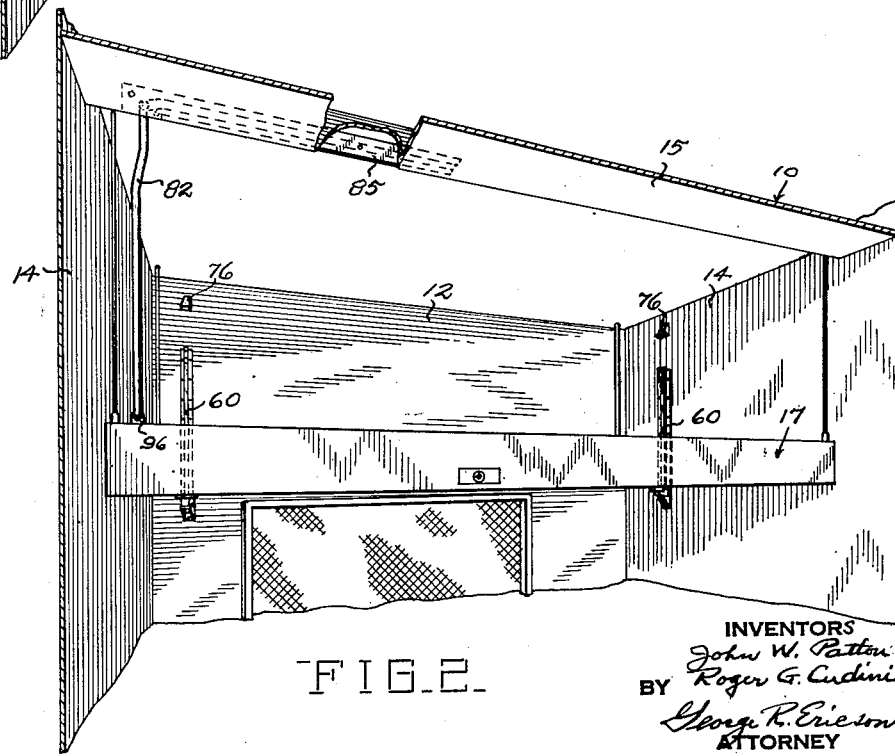
Figure 2 is a view similar to Figure 1 showing the upper berth in prone position.
Figure 9:
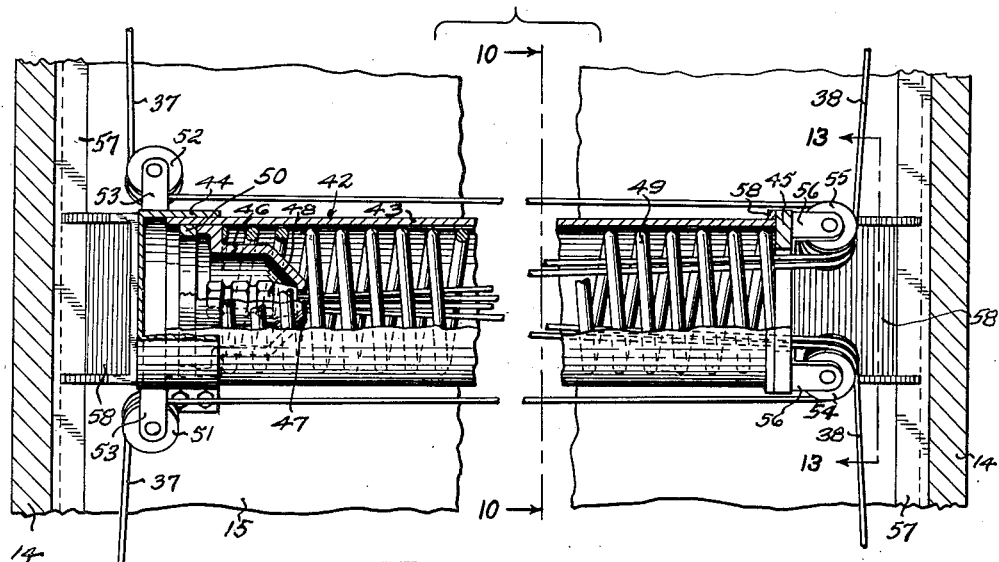
Figure 9 is a plan view partly in section taken on line 9—9 of Figure 10 showing the cable support for the bed pan.
Figure 10:
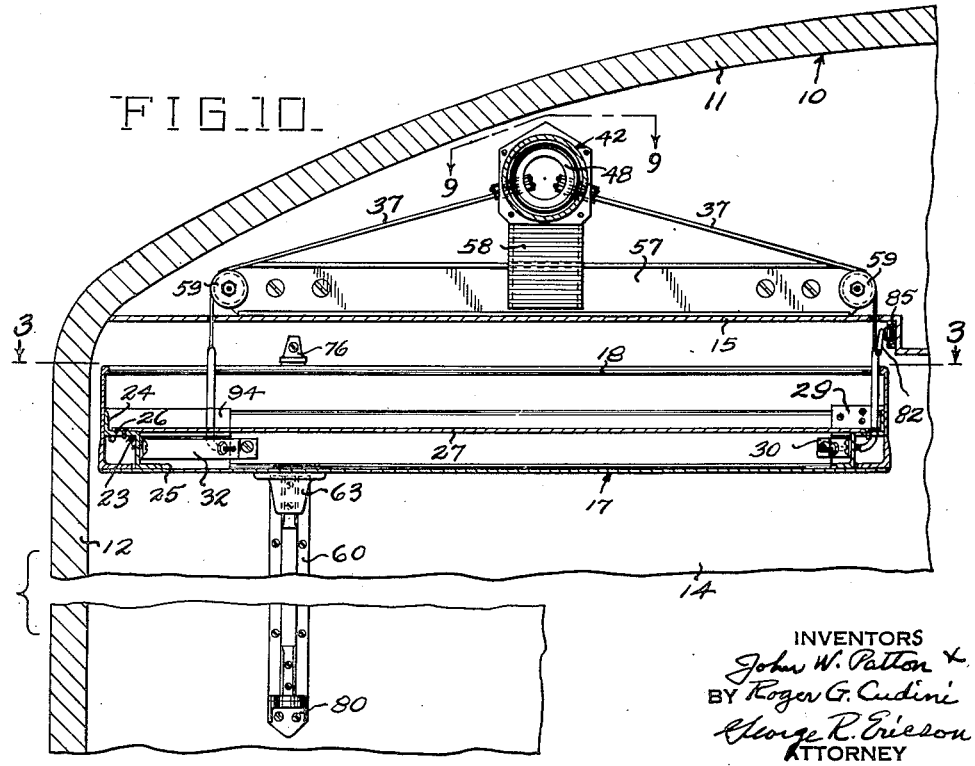
Figure 10 is a sectional view of the cable support taken on line 10—10 of Figure 9.

In the drawings, a railway sleeping car 10 is formed with a roof 11 and outer side wall one of which is indicated by numeral 12. The space within the car is divided into rooms by transversely extending panels 14. In each room there is a ceiling member 15, a floor 16 and a vertically movable berth structure 17.

The berth structure includes a pan consisting of marginal wall members 18, welded together at their adjacent ends as indicated at 20, and a bottom cover plate 21 secured to the under-side of flanges 22 extending inwardly from the marginal wall members. The pan is internally reinforced around the base portion by W-shaped members 23 overlying the flanges 22 of the marginal walls and having the upper legs 24 thereof parallel with and secured to the adjacent marginal wall and the lower legs 25 thereof extending parallel with and secured to the bottom plate 21. These reinforcing members together with the adjacent marginal pan members and the bottom plate form a box-like frame structure around the base portion of the pan. The center upper legs 26 of the reinforcing members extend horizontally in the pan and form a shelf on which a false bottom plate 27 is detachably secured. Reinforcing ribs 28 extend transversely within the rectangular shaped pan between the side reinforcing members and are secured on the bottom plate 21. The end reinforcing members 23 terminate short of the marginal walls at the sides of the pan and between the ends of the end reinforcing members and one side wall are angle irons 94. The reinforcing member at such side of the pan extends between the ends of the angle irons 94 which are secured to the end walls. At the other side of the pan the longitudinally extending reinforcing member terminates short of the corner and brackets 29 are fixed with such corners. The ends of the reinforcing members 23 adjacent the brackets 29 are bridged by angle brackets 30 which are secured thereto by screws 33. At the other side of the pan, corner brackets 32 extend between the adjacent ends of the reinforcing members 23 and are secured thereto by screws 33. End reinforcing angle irons 94 are provided with openings through which bent tubes 34 extend and similar bent tubes 35 extend through corner brackets 29. Such bent tubes are suitably secured by soldering or other means as indicated by numeral 36.

The berth structure is carried by supporting means permitting its movement to an upper stored position adjacent ceiling 15 and to a lower prone position for occupancy above a lower berth (not shown) such means includes cables 37 attached to one end of the pan structure and cables 38 attached to the other end of the pan structure. These cables are arranged to be fastened to the pan adjacent each corner thereof, cables 37 extending one through tube 34 and another through tube 35 and cables 38 extending one through tube 34 and the other through the tube 35. These tubes have a vertical portion close to the adjacent marginal wall and a horizontal portion extending toward the adjacent bracket 30 or 32 located beneath the false bottom of the pan. The end of each cable is secured by adjustable fastening means to the brackets 30 or 32 and is anchored within nuts 39. The nuts in turn carry the head ends of screws 40 threaded through openings in brackets 30 or 32. Nuts 41 are associated with the screw members 40 to secure them in adjusted position. Axial adjustment of these screw members will vary the position of the lower ends of the cables relative to anchorage with the pan in order that a level pan suspension can be provided. The false bottom plate is removed when the cables are being attached, detached, or adjusted with relation to the pan.

The supporting means for the pan in addition to the cables includes a device, indicated generally by numeral 42, for anchoring and guiding the upper ends of the cables and counterbalancing the weight of the berth structure. The device has a cylindrical housing 43 with a cap 44 secured over one end and a ring 45 secured at the other end. Within the closed end of the cylinder is a piston 46 serving as an anchor for the upper ends of the four cables 37 and 38. The head of the piston has a central opening 47 through which the cables extend and on the ends of the cables within the piston is a nut structure 48 to which they are secured and by means of which they are anchored against the piston head. Between the piston and the ring end 45 of the housing is arranged a coil spring 49 compressed sufficiently to exert a minimum force against the piston slightly greater than and opposing the force exerted by the weight of the pan. The piston movement toward the cap end of the cylinder is limited by a stop ring 50 suitably secured within the cylinder.

Pulleys 51 and 52 are carried by brackets 53 fixed to the cap end 44 of the cylinder and dual pulleys 54 and 55 are carried by brackets 56 fixed to the end of ring member 45. The counterbalance and anchor device for the cables is located adjacent the roof of the car and fixed in the car to the ceiling 15 are two spaced beams 57 to which brackets 58 supporting the anchor and counterbalance device are secured. These brackets 58 are fixed to and depend from ring 45 which is fastened by screw bolts 19 to collar 18 fixed on the cylinder. The beams 57 carry a pulley 59 at each end and are spaced and arranged so that a cable passing over each pulley will extend substantially vertically with the adjacent bent tube 34 or 35 thereunder. It will be seen that cables 37 at one end of the berth extend through the center of the compression spring 49 and the end ring 45, over pulleys 54 and 55, along the length of and outside the cylinder 43 to pulleys 51 and 52 and over such pulleys to pulleys 59 at the adjacent ends of the beams. The cables 38 at the other end of the berth extend over the adjacent pulleys 59, pulleys 54 and 55 and through end ring 45 and compression spring 49. All four of the cables are anchored in the follower piston 46 controlled by the counterbalance compression spring 49.

The berth structure is guided in its vertical movement by a pair of means associated with two adjacent walls of the room. Such guide means each consist of a vertically extending track member 60 secured on the inner face of its wall by screws 61 and a shoe member 62 formed integral with housings 63 secured by screws 64 to the bottom of the berth pan structure. One of these shoes extends beyond the side of the berth adjacent the outside wall 12 to engage the track member 60 on wall 12 and the other shoe extends beyond one end of the berth to engage with track member 60 on a transverse wall 14 of the room. The outer extremities of the shoes are formed with slots 65 for receiving the head end of the tracks and with flanges 66 extending toward each other under the heads of the track members. The shoe members have sufficient clearance around the heads of the track members so that there is freedom of movement of the berth without binding. The shoe members 62 form the top of housings 63 and are slotted to provide access therebelow. The slots are covered by detachable plates 62' secured by screws 67. These two guide means are associated so that one is arranged on a side wall adjacent one end of the berth structure and the other guide means is arranged intermediate the ends of the opposite ends of the berth structure. By this arrangement of guide means the danger of binding due to cocking and wear is substantially eliminated and has been found to be far superior to guide means in which there are more than two of such devices.

Devices are provided to take up the looseness between the guide shoes and guide rails when the berth structure is in either stored or prone positions. Such devices include camming means 69 at each end of the face of the guide rails and a follower device mounted in the lower portion of the shoe carrier 63. The camming means 69 consists of plates having cammed surfaces 70 and secured to the ends of the rail heads by screws 71. The follower devices consist of a roller 72 mounted on a shaft 72' carried by the arms of a U-shaped carrier 73. A guide stem 74 extends through an opening in base of carrier 73 and is secured by nut 63'. Spring 75 surrounds such stem and bears at one end against housing 63 and at the other end against the carrier 73 and spring 73' lies between the base of the carrier and nut 63. Spring 75 is opposed by spring 73' so that the roller normally will not engage the track member when moving between cam faces 70. As the berth moves to positions where the rollers 72 ride on cam faces 70, as shown in Figure 14, the rollers and their carriers will be moved inwardly of the berth pan compressing the spring 75 and thereby shifting the berth sufficiently to hold the flanges 66 of the shoe members tightly against the heads of the rail members so that the berth is held tightly when in prone or stored positions.

Stop means are provided to limit the vertical movement of the berth structure. Above the rail members 60 on walls 12 and 14 above the rail members is a stop device each consisting of a carrier 76 secured by screw means 77, and suitably secured to the under face of such member 76 is a rubber strip 78. The arrangement is such that the rubber strip will be engaged by the beads 79 formed at the upper edge of the adjacent marginal walls of the berth pan and will limit its movement toward the ceiling and thereby determine its storage position. At the bottom of each rail member and suitably secured to the adjacent walls of the rooms is a bracket 80 carrying a rubber pad 81 that projects into the path of movement of housings 63 to limit the downward movement of the berth pan and to support the same in prone position.

The berth structure is also supported in its prone position by a device suspended from the upper wall structure of the room and such device moves automatically with the berth to become effective or ineffective depending upon the position of the berth. This device comprises a rod 82 having one end pivoted on pin 83 carried by bracket 96 at the corner of the berth across from the guide means on the side of the berth. At the other end of the rod 82 is a shaft 87 carrying a roller 86 which rides in a groove 84 formed in housing 85 suitably secured to a vertical portion of the ceiling of the room. This guideway extends lengthwise of the room and the major portion thereof extends horizontally while one end curves downwardly and its lowermost end portion acts to limit downward movement of the roller to suspend the rod in substantially vertical position when the berth is in its prone position and thereby act as a further support for the berth structure. The roller is free to ride in the guideway and it will roll automatically in the guideway as the berth is moved upwardly or downwardly. Thus, when the berth is in stored position, the rod will lie substantially parallel with the base plate of the berth structure and with the rubber pads 81 will form a three point support for the berth structure when in prone position.

Mattress 97 is carried in the pan structure and rests on false bottom plate 27. The pan is retained in stored and prone positions by latch means as indicated by numeral 98 mounted in walls 14 and these latches are released by reciprocal members 99 actuated by key operated mechanism in housing 100. Such latch control mechanism is mounted in the pan between the bottom and false bottom plates.

The invention may be modified in various respects as will occur to those skilled in the art and the exclusive use of all modifications as come within the scope of the appended claims is contemplated.

What is claimed is:

1. Mechanism for supporting a vertically movable berth in a room comprising a cylinder mounted horizontally in the upper part of the room, said cylinder having an opening in one end, a coil spring in compression in the cylinder, a ring member in the opposite end of the cylinder from the open end against which an end of the spring bears, pulley means on the ends of the cylinder, cables extending over the pulley means and secured at their lower ends to corner portions of the berth, the upper ends of the cables extending through the cylinder and opening, the coil spring and the ring member, bearing means on the ends of the cables engaging against the ring member, and abutment means in the cylinder limiting movement of the ring member beyond a position in which the spring will be in compression.

2. In a room having therein a vertically movable suspended berth, vertically extending grooved members on only two adjacent walls of the room, and guide shoes extending from said berth and slidable in the grooves of said vertically extending members on the walls for guiding said berth in its vertical movement without cocking.

3. In a room having therein a vertically movable berth, vertically extending track members on two adjacent walls of the room, guide shoes extending from the berth having a loose sliding fit with the track members, and means retaining the guide shoes and tracks in tight relationship when the berth is in stored and prone positions.

4. In a room having therein a vertically movable berth, means on the berth and two adjacent walls of the room cooperating to guide the berth in its vertical movement, and means cooperating with said guide means to restrain lateral movement of the berth in stored and prone positions.

5. In a room having a vertically movable berth therein, means suspending the berth, vertical track members on two adjacent walls of the room, extensions from the berth having shoes slidably engaging the tracks, cam means on the end portions of the tracks, and means carried by the extensions and acted upon by the cam means for restraining lateral movement of the berth when in stored and prone positions.

6. In a room having a vertically movable berth therein, track members on two adjacent vertical walls of the room, shoe members on the berth slidably engaging the track members, cam means on the ends of the track members, rollers carried by the shoe members engaging the track members, and spring means exerting pressure against the rollers in a direction toward the adjacent track, said cam means acting against the rollers when engaged thereby to bias the springs thereby clamping the shoe members against the track members.

7. In a room having a vertically movable berth suspended therein, vertically extending track members on two adjacent walls of the room, shoe members on the berth slidably engaging the track members, stop means on the base of the track members on which the shoe members rest when the berth is in lowered, use position, a rod pivoted at its lower end to a corner portion of the berth remote from the guide shoes, and guide means on a wall of the room in which the upper end of the rod is slidably mounted, said guideway being located so that the rod is suspended from the bottom thereof when the berth is in lowered, use position and will swing to a horizontal position above the berth when the berth is in stored position.

8. In a room having a vertically movable berth pan therein, cables having their lower ends attached to interior corner portions of the pan, bent guide tubes attached to and projecting upwardly from the interior corners of the pan, said cables extending through the tubes, and means mounted in the ceiling portion of the room to which the upper ends of the cables are anchored.

9. In a room having a vertically movable pan therein, reinforcing angle members around said pan, corner brackets in said pan fixed to the adjacent ends of the reinforcing members, corner members fixed to the inside of the pan beyond the brackets, cables anchored to said corner brackets, and bent tubes fixed to and extending through said corner members, said cables extending through said tubes.

JOHN W. PATTON.
ROGER G. CUDINI.

REFERENCES CITED

The following references are of record in the file of this patent:

UNITED STATES PATENTS

| Number | Name | Date |
| --- | --- | --- |
| 276,546 | Woodruff | Apr. 24, 1883 |
| 292,595 | Shorey | Jan. 29, 1884 |
| 512,184 | Woodruff | Jan. 2, 1894 |
| 931,962 | Rountree | Aug. 24, 1909 |
| 967,137 | Leigh | Aug. 9, 1910 |
| 1,109,476 | Sorlein | Sept. 1, 1914 |
| 1,197,035 | Knudtson et al. | Sept. 5, 1916 |
| 1,714,613 | Montgomery | May 28, 1929 |
| 2,358,546 | Tully et al. | Sept. 19, 1944 |
| 2,432,572 | Jones et al. | Dec. 16, 1947 |